United States Patent
Yang et al.

(10) Patent No.: US 10,135,349 B2
(45) Date of Patent: Nov. 20, 2018

(54) POWER SUPPLY DEVICE AND POWER SUPPLY METHOD

(71) Applicant: Chicony Power Technology Co., Ltd., New Taipei (TW)

(72) Inventors: Shun-Hsu Yang, New Taipei (TW); Lyu-Jhih Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/402,202

(22) Filed: Jan. 9, 2017

(65) Prior Publication Data

US 2018/0091043 A1    Mar. 29, 2018

(30) Foreign Application Priority Data

Sep. 26, 2016 (TW) .............................. 105214748 U

(51) Int. Cl.
*H02M 3/335* (2006.01)

(52) U.S. Cl.
CPC ... *H02M 3/33561* (2013.01); *H02M 3/33592* (2013.01)

(58) Field of Classification Search
CPC ..... H02M 2001/008; H02M 2001/009; H02M 3/335; H02M 3/33561; H02M 3/33576; H02M 3/33592
See application file for complete search history.

(56) References Cited

U.S. PATENT DOCUMENTS

| | | | | |
|---|---|---|---|---|
| 2001/0002171 | A1* | 5/2001 | Abdoulin | H02M 3/33561 363/89 |
| 2004/0257838 | A1* | 12/2004 | Gan | H02M 3/33592 363/21.06 |
| 2010/0315845 | A1* | 12/2010 | Kotani | H02M 3/33561 363/37 |
| 2011/0310639 | A1* | 12/2011 | Hsu | H02M 3/33561 363/21.14 |
| 2012/0155119 | A1* | 6/2012 | Kim | H02M 3/33561 363/17 |
| 2012/0235626 | A1* | 9/2012 | Oh | H02J 7/0022 320/103 |
| 2015/0117070 | A1* | 4/2015 | Wang | H02M 3/33561 363/21.14 |
| 2017/0033694 | A1* | 2/2017 | Tseng | H02M 3/33507 |
| 2017/0261910 | A1* | 9/2017 | Kasamatsu | G03G 15/80 |
| 2017/0358994 | A1* | 12/2017 | Ueno | H02M 1/10 |

* cited by examiner

*Primary Examiner* — Fred E Finch, III
(74) *Attorney, Agent, or Firm* — CKC & Partners Co., Ltd.

(57) ABSTRACT

A power supply device includes a first voltage conversion unit and a second voltage conversion unit. The first voltage conversion unit performs a step-down operation according to a first voltage to output a first output voltage via a first connection interface. The second voltage conversion unit includes a first rectifying circuit and a power delivery circuit. The first rectifying circuit performs a first rectifying operation based on load information of a load and the first voltage to generate a second voltage. The power delivery circuit determines, according to the load information and the second voltage, whether to output the second voltage as a second output voltage to the load via a second connection interface. The first connection interface is different from the second connection interface, and the second output voltage is higher than or equal to the first output voltage.

20 Claims, 6 Drawing Sheets

POWER SUPPLY DEVICE AND POWER SUPPLY METHOD

RELATED APPLICATIONS

This application claims priority to Taiwan Application Serial Number, 105214748, filed Sep. 26, 2016, which is herein incorporated by reference.

BACKGROUND

Technical Field

The present disclosure relates to a power supply technology. More particularly, the present disclosure relates to a power supply device and a power supply method.

Description of Related Art

Universal serial buses (USB) have been widely utilized in electronic devices. With the increased demand for the data transfer speed and the charging speed, USB interfaces have been developed from a Type-A connection interface to a Type-C connection interface.

However, as the electronic devices, which employ Type-A connection interfaces, have been existed for a long time, a power supply device which able to support charging of electronic devices having different types of connection interfaces is required during the transition period, in order to popularize the Type-C connection interface.

SUMMARY

Some aspects of the present disclosure are to provide a power supply device that includes a first voltage conversion unit and a second voltage conversion unit. The first voltage conversion unit is configured to perform a step-down operation according to a first voltage, in order to output a first output voltage via a first connection interface. The second voltage conversion unit is coupled to the first voltage conversion unit, and includes a first rectifying circuit and a power delivery circuit. The first rectifying circuit is configured to perform a first rectifying operation based on a load information of a load and the first voltage, in order to generate a second voltage. The power delivery circuit is coupled to the first rectifying circuit, and is configured to determine, according to the load information and the second voltage, whether to output the second voltage as a second output voltage to the load via a second connection interface. The power delivery circuit is coupled to the second connection interface to detect the load information, the first connection interface is different from the second connection interface, and the second output voltage is higher than or equal to the first output voltage.

Another aspects of the present disclosure are to provide a power supply method that includes: performing a step-down operation according to a first voltage, in order to output a first output voltage via a first connection interface; and performing a first rectifying operation based on a load information of a load and the first voltage, in order to generate a second voltage; and determining, according to the load information and the second voltage, whether to output the second voltage as an second output voltage to the load via a second connection interface, in which load information is detected by a power delivery circuit that is coupled to the second connection interface, the first connection interface is different from the second connection interface, and the second output voltage is higher than or equal to the first output voltage.

As discussed above, the power supply device and the power supply method of the present disclosure are able to simultaneously provide electrical energy to electronic devices, which have different types of connection interfaces, with multiple arrangements.

BRIEF DESCRIPTION OF THE DRAWINGS

Aspects of the present disclosure are best understood from the following detailed description when read with the accompanying figures.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations.

In this document, the term "coupled" or "connected" indicates that two or more elements are in "direct" physical or electrical contact with each other, that two or more elements have "indirect" physical or electrical contact with each other, or that two or more elements cooperate or interact with each other.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
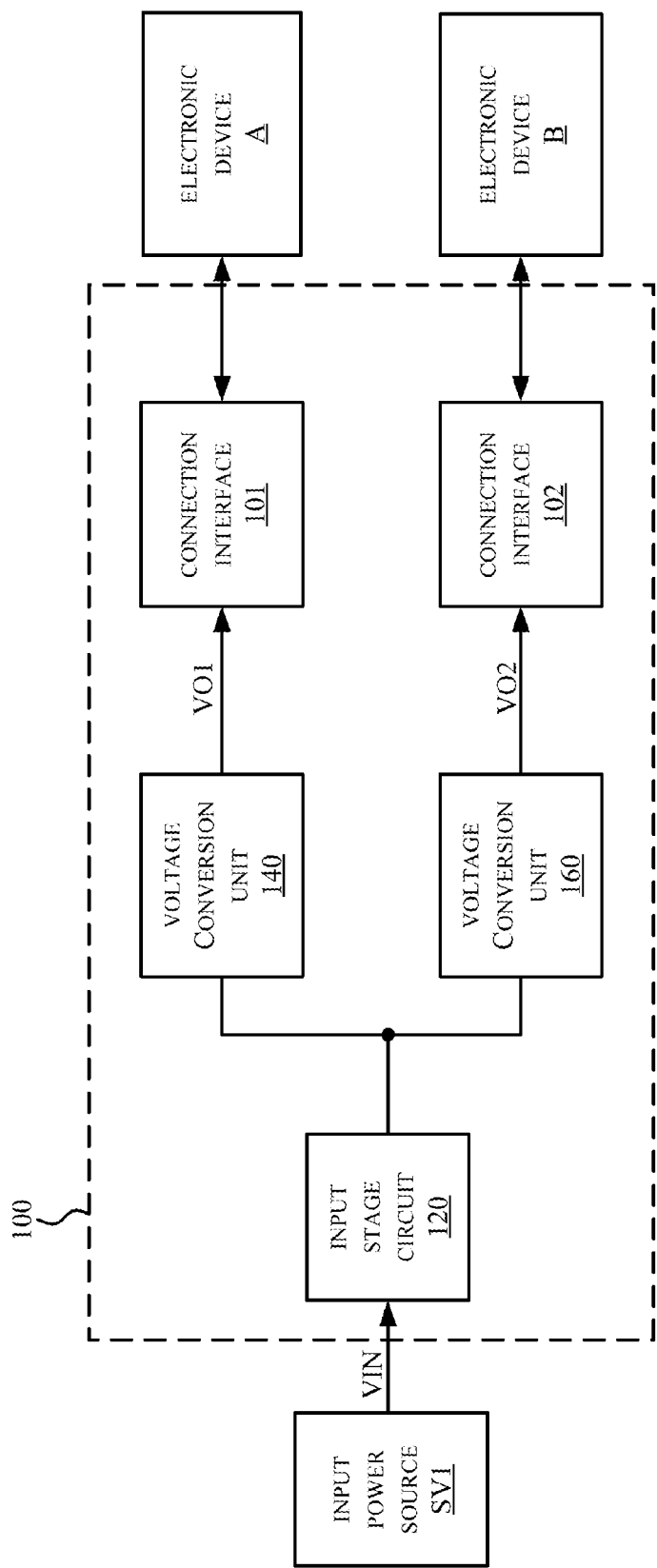
FIG. 1 is a schematic diagram of a power supply device, in accordance with some embodiments of the present disclosure.

Reference is now made to FIG. 1. FIG. 1 is a schematic diagram of a power supply device 100, in accordance with some embodiments of the present disclosure.

The power supply device 100 includes a connection interface 101 and a connection interface 102, in which the connection interface 101 is configured to connect with an electronic device A, and the connection interface 102 is configured to connect with an electronic device B. In some embodiments, the connection interface 101 is different from the connection interface 102. For example, the connection interface 101 is a universal serial bus (USB) Type-A interface, and the connection interface 102 is an USB Type-C interface. The electronic device A and the electronic device B can be, for example, tablets, laptops, hard disks, smart phones, servers, cameras, recorder, etc.

The implementations of the connection interface 101 and the connection interface 102 are given for illustrative purposes only. Various types of the connection interface 101 and the connection interface 102 are within the contemplated scope of the present disclosure. The implementations of the electronic device A and the electronic device B are given for illustrative purposes only. Various implementations of the electronic device A and the electronic device B are within the contemplated scope of the present disclosure.

As shown in FIG. 1, the power supply device 100 includes an input stage circuit 120, a voltage conversion unit 140, and a voltage conversion unit 160. The input stage circuit 120 is coupled to an input power source SV1 to receive a voltage VIN provided by the input power source SV1. The input stage circuit 120 is coupled to the voltage conversion unit 140 and the voltage conversion unit 160. In some embodiments, the voltage conversion unit 140 is configured to perform a step-down operation according to the voltage VIN, in order to output an output voltage VO1 to the electronic device A via the connection interface 101. In some embodiments, the output voltage VO1 is about 5.1 Volts.

In some embodiments, the voltage conversion stage 160 is configured to generate an output voltage VO2 according to the voltage VIN, in order to output the output voltage VO2 to the electronic device B via the connection interface 102. In some embodiments, the output voltage VO2 is configured to be higher than or equal to the output voltage VO1. For example, in some embodiments, the output voltage VO2 is about 5.1 Volts, 5.5 Volts, or 12 Volts.

The values of the output voltages VO1 and VO2 are given for illustrative purposes only. Various values of the output voltages VO1 and VO2 are within the contemplated scope of the present disclosure.

Figure 2A:
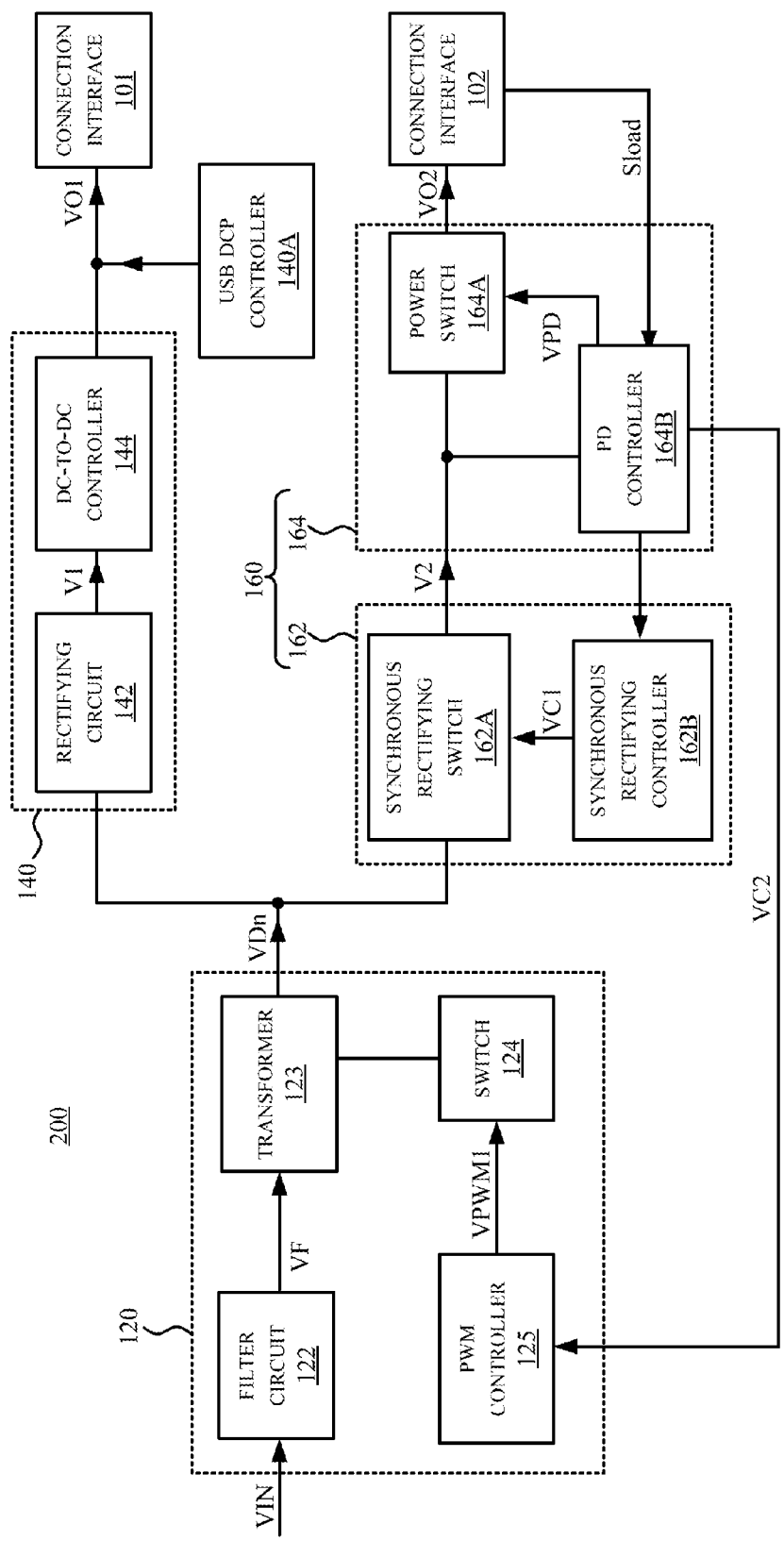
FIG. 2A is a schematic diagram of a power supply device, in accordance with some embodiments of the present disclosure.

Reference is now made to FIG. 2A. FIG. 2A is a schematic diagram of a power supply device 200, in accordance with some embodiments of the present disclosure. For ease of understanding, similar elements in FIG. 2A are designated with the same reference number with respect to FIG. 1.

As shown in FIG. 2A, the input stage circuit 120 includes a filter circuit 122, a transformer 123, a switch 124, a pulse width modulation (PWM) controller 125. The filter circuit 122 is coupled to the input power source SV1, in order to filter noises on the voltage VIN to generate a filtered voltage VF. In some embodiments, the filter circuit 122 can be implemented with an electromagnetic interference (EMI) filter and a bulk capacitor. The implementation given above is only for illustrative purposes, and various arrangements of the filter circuit 122 are within the contemplated scope of the present disclosure.

The transformer 123 is coupled between the filter circuit 122 and the voltage conversion units 140 and 160, in order to receive the filtered voltage VF. In some embodiments, the transformer 123 outputs at least one driving voltage VDn to the voltage conversion units 140 and 160 in response to the filtered voltage VF.

The switch 124 is coupled to the transformer 123 to regulate the at least one driving voltage VDn according to a pulse signal VPWM1. The PWM controller 125 is coupled to the switch 124. In some embodiments, the switch 124 can be implemented with an N-type field-effect transistor (FET), but the present disclosure is not limited thereto. The PWM controller 125 is configured to output the pulse signal VPMW1 based on a load information Sload associated with the electronic device B. In some embodiments, the load information Sload includes electronic signals that indicate a value of the output voltage VO2 required by the electronic device B.

As shown in FIG. 2A, the voltage conversion unit 140 includes a rectifying circuit 142 and a DC-to-DC controller 144. The rectifying circuit 142 is electrically coupled to the transformer 123 to receive the at least one driving voltage VDn (e.g., the driving voltage VD1 as discussed below). The rectifying circuit 142 is configured to perform a rectifying operation according to the at least one driving voltage VDn (e.g., the driving voltage VD1 as discussed below) to generate a voltage V1. For example, the at least one driving voltage VDn is an AC voltage, and the rectifying circuit 142 can convert the at least one driving voltage VDn to a DC voltage (i.e., the voltage V1).

The DC-to-DC controller 144 is coupled between the rectifying circuit 142 and the connection interface 101. The DC-to-DC controller 144 is configured to perform the step-down operation on the voltage V1, in order to generate the output voltage VO1 to the electronic device A.

In some embodiments, the electronic device 200 further includes a USB dedicated charging port (DCP) controller 140A. The USB DCP controller 140A is coupled between the DC-to-DC controller 144 and the connection interface 101. The USB DCP controller 140A is configured to support an USB Charging Specification, Revision 1.2. For example, the USB DCP controller 140A can provide functions, which include, for example, a short mode for a D+ pin and a D− pin of the USB interface and applying voltages which have various values to the D+ pin and the D− pin. The above functions of the USB DCP controller 140A are given for illustrative purposes only, and the present disclosure is not limited thereto.

As shown in FIG. 2A, the voltage conversion unit 160 includes a rectifying circuit 162 and a power delivery (PD) circuit 164. The rectifying circuit 162 is configured to perform a rectifying operation based on the load information Sload of the electronic device B and the voltage VIN, in order to generate a voltage V2. The rectifying circuit 162 is electrically coupled to the transformer 123 to receive at least one driving voltage VDn (e.g., a driving voltage VD2 as discussed below). In some embodiments, the rectifying circuit 162 can perform a synchronous rectifying operation on the at least one driving voltage VDn (e.g., a driving voltage VD2 as discussed below) in order to generate the voltage V2.

In some embodiments, as shown in FIG. 2A, the rectifying circuit 162 includes a synchronous rectifying switch 162A and a synchronous rectifying controller 162B. The synchronous rectifying switch 162A is configured to perform the rectifying operation according to a control signal VC1 and the at least one driving voltage VDn (e.g., the driving voltage VD2 as discussed below), in order to generate the voltage V2. The synchronous rectifying controller 162B is configured to generate the control signal VC1 based on the load information Sload.

In some embodiments, the PD circuit 164 is coupled to the connection interface 102, in order to detect the load information Sload of the electronic device B. The PD circuit 164 is configured to, according to the voltage V2 and the load information Sload, determine whether to output the voltage V2 as the output voltage VO2 to the electronic device B.

For example, the PD circuit 164 includes a power switch 164A and a PD controller 164B. The power switch 164A is coupled between the synchronous rectifying switch 162A and the connection interface 102. The power switch 164A is configured to be turned on according to a power supply control signal VPD, in order to output the voltage V2 as the output voltage VO2 to the electronic device B.

The PD controller 164B is coupled to the synchronous rectifying switch 162A, the synchronous rectifying controller 162B, the power switch 164A, and the connection interface 102. In some embodiments, the PD controller 164B is configured to output the power supply control signal VPD when the voltage V2 meets the voltage requirements of the load information Sload, in order to turn on the power switch 164A.

For example, based on the load information Sload that is transmitted from the electronic device B, the PD controller 164B detects that the connection interface 102 is already connected to the electronic device B, and the electronic device B requires the output voltage VO2 having 12 Volts. Accordingly, the PD controller 164B outputs the power supply control signal VPD when the voltage V2 is rectified to be 12 Volts, in order to turn on the power switch 164A. As a result, the voltage V2 is outputted as the output voltage VO2, and is transmitted to the electronic device B via the connection interface 102.

In some embodiments, the PWM controller 125 is coupled to the PD controller 164B, in order to adjust the duty cycle of the pulse signal VPWM1 based on the load information Sload. For example, based on the load information Sload, the PD controller 164B outputs a control signal VC2 to the PWM controller 125. The PWM controller 125 generates the pulse signal VPWM1 having different duty cycles according to the control signal VC2. In some embodiments, the PWM controller 125 is coupled to the PD controller 164B via an optical coupler (not shown), but the present disclosure is not limited thereto. Various arrangements of wireless transmission are within the contemplated scope of the present disclosure.

In some other embodiments, the PD controller 164B is configured to control the synchronous rectifying controller 162B based on the load information Sload, in order to adjust the voltage V2. Alternatively, in some yet other embodiments, the PD controller 164B is configured to adjust the pulse signal VPWM1 and/or the voltage V2 based on the load information Sload. In some embodiments, the above arrangements are also able to be integrated with cable compensation operations, in order to compensate actual voltage drops over the cables.

The above arrangements of the PD controller 164B are given for illustrative purposes only. Various arrangements of the PD controller 164B are within the contemplated scope of the present disclosure.

Figure 2B:
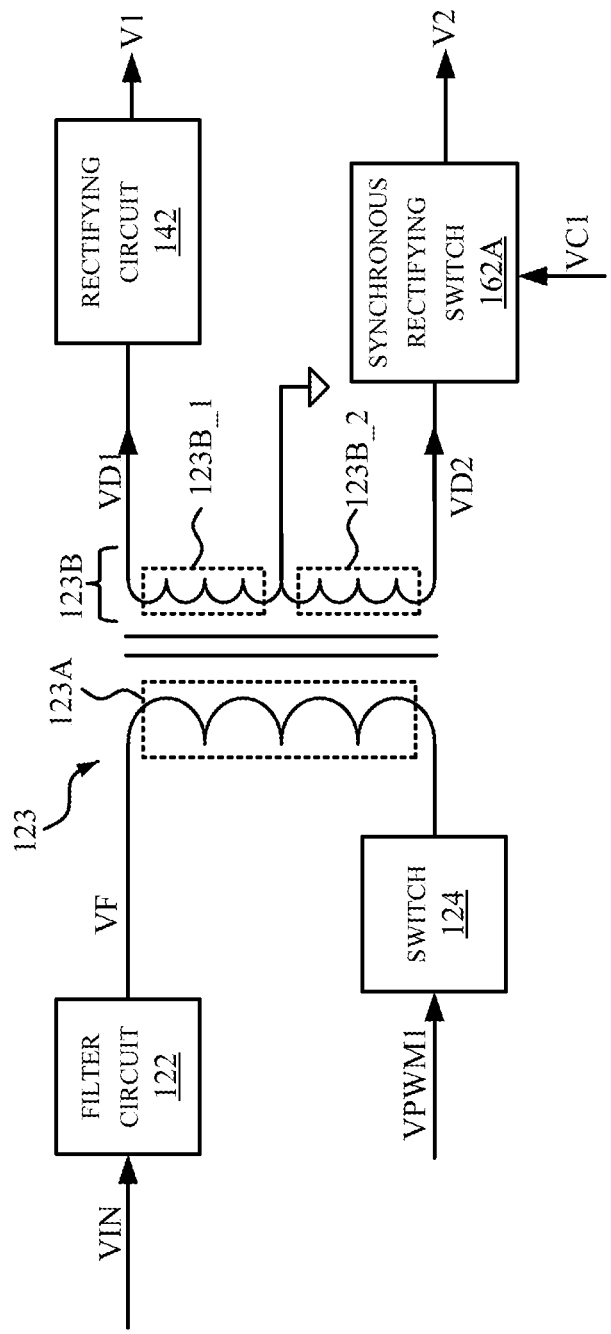
FIG. 2B is a circuit diagram of the transformer in FIG. 2A, in accordance with some embodiments of the present disclosure.

Reference is now made to FIG. 2B. FIG. 2B is a circuit diagram of the transformer 123 in FIG. 2A, in accordance with some embodiments of the present disclosure. For ease of understanding, similar elements in FIG. 2B are designated with the same reference numbers with respect to FIG. 2A.

As shown in FIG. 2B, in some embodiments, the transformer 123 includes a primary winding 123A and a secondary winding 123B. A first terminal of the primary winding 123A is coupled to the filter circuit 122, in order to receive the filtered voltage VF. A second terminal of the primary winding 123A is coupled to the switch 124. The secondary winding 123B includes an auxiliary winding 123B_1 and an auxiliary winding 123B_2. The auxiliary winding 123B_1 is electrically coupled to the auxiliary winding 123B_2 in series. The auxiliary winding 123B_1 is electrically coupled with the primary winding 123A, in order to generate the driving voltage VD1 to the rectifying circuit 142. The auxiliary winding 123B_2 is electrically coupled with the primary winding 123A, in order to generate the driving voltage VD2 to the synchronous rectifying switch 162A.

The above arrangements of the transformer 123 are given for illustrative purposes only. Various arrangements to generate the at least one driving voltage VDn are within the contemplated scope of the present disclosure.

Figure 3:
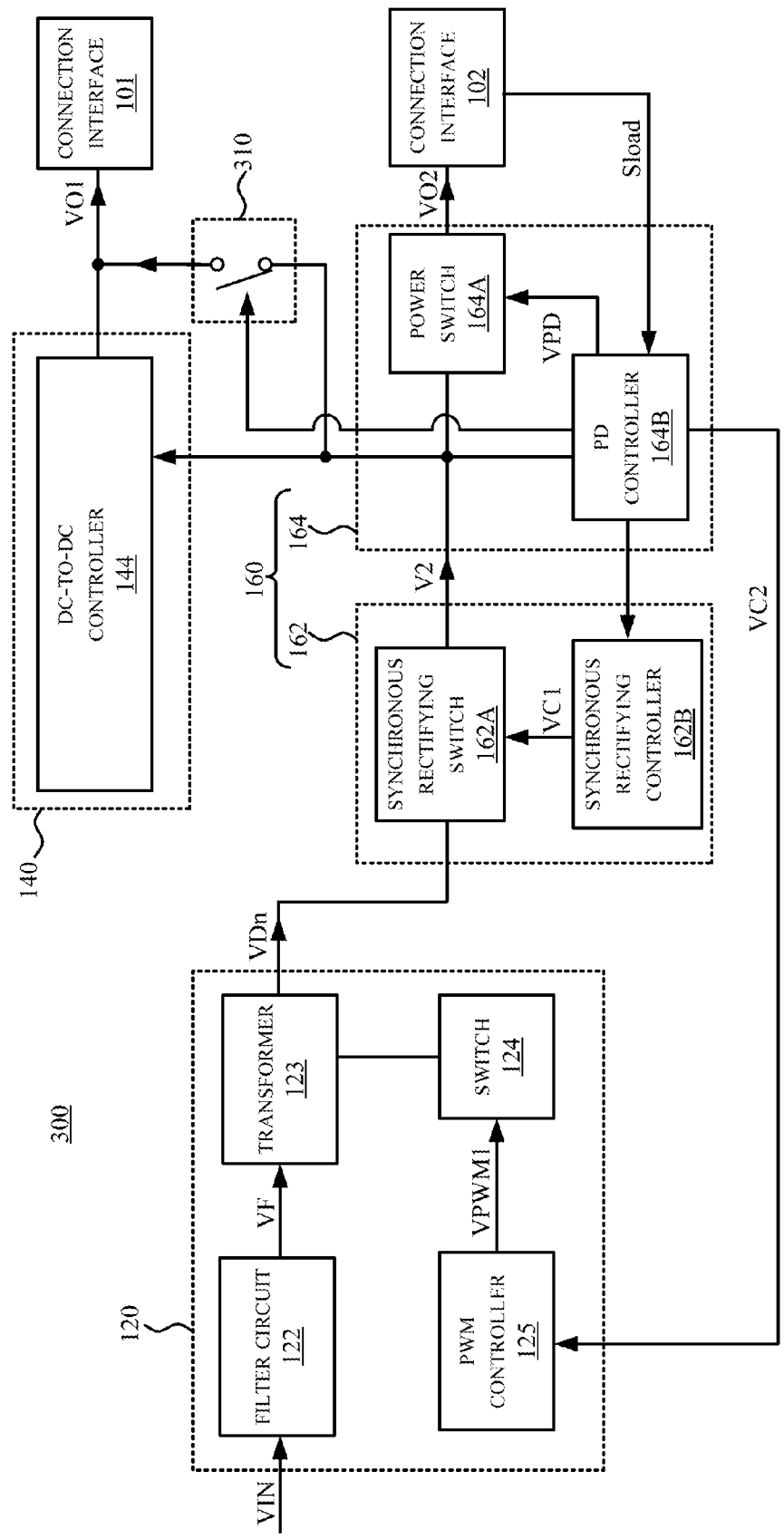
FIG. 3 is a schematic diagram of a power supply device, in accordance with some embodiments of the present disclosure.

Reference is now made to FIG. 3. FIG. 3 is a schematic diagram of a power supply device 300, in accordance with some embodiments of the present disclosure. For ease of understanding, similar elements in FIG. 3 are designated with the same reference numbers with respect to FIG. 2A.

Compared with FIG. 2A, the power supply device 300 further includes a power switch 310, and the voltage conversion unit 140 thereof only includes the DC-to-DC controller 144. In the example of FIG. 3, the DC-to-DC controller 144 is configured to receive the voltage V2, and to perform the step-down operation on the voltage V2 to generate the output voltage VO1 to the electronic device A.

The power switch 310 is coupled between the rectifying circuit 162 and the connection interface 101. In this example, the PD controller 164B is further configured to detect the voltage V2, and to turn on the power switch 310 on condition that the voltage V2 is at a predetermined voltage level. As a result, the power switch 310 can transmit the voltage V2 to the connection interface 101. Effectively, the voltage V2 is outputted as the output voltage VO1 to the electronic device A. In some embodiments, the power switch 310 is implemented with a P-type FET, but the present disclosure is not limited thereto.

In some embodiments, the predetermined voltage level is about 5.1 Volts. As described above, in some embodiments, the output voltage VO2 is about 5.1 Volts, 5.5 Volts, or 12 Volts. In this example, on condition that the voltage V2 is about 5.1Volts, the power switch 310 is turned on to output the voltage V2 as the output voltage VO1. In some embodiments, on condition that the voltage V2 is not at the predetermined voltage level, the power switch 310 is not turned on. Under this condition, the DC-to-DC controller 144 performs the step-down operation on the voltage V2, in order to generate the output voltage VO1 having other values (e.g., 5.5 Volts and 12 Volts).

With the above arrangements, the voltage conversion unit 140 and the voltage conversion unit 160 both share part of circuits (i.e., the synchronous rectifying switch 162A, the synchronous rectifying controller 162B, and the PD controller 164B). Therefore, compared with the power supply device 200 in FIG. 2A, the number of the circuits employed in the power supply device 300 is reduced. As a result, the size of the power supply device 300 is also reduced. Accordingly, the costs for implementing the power supply device 300 are also saved.

Figure 4:
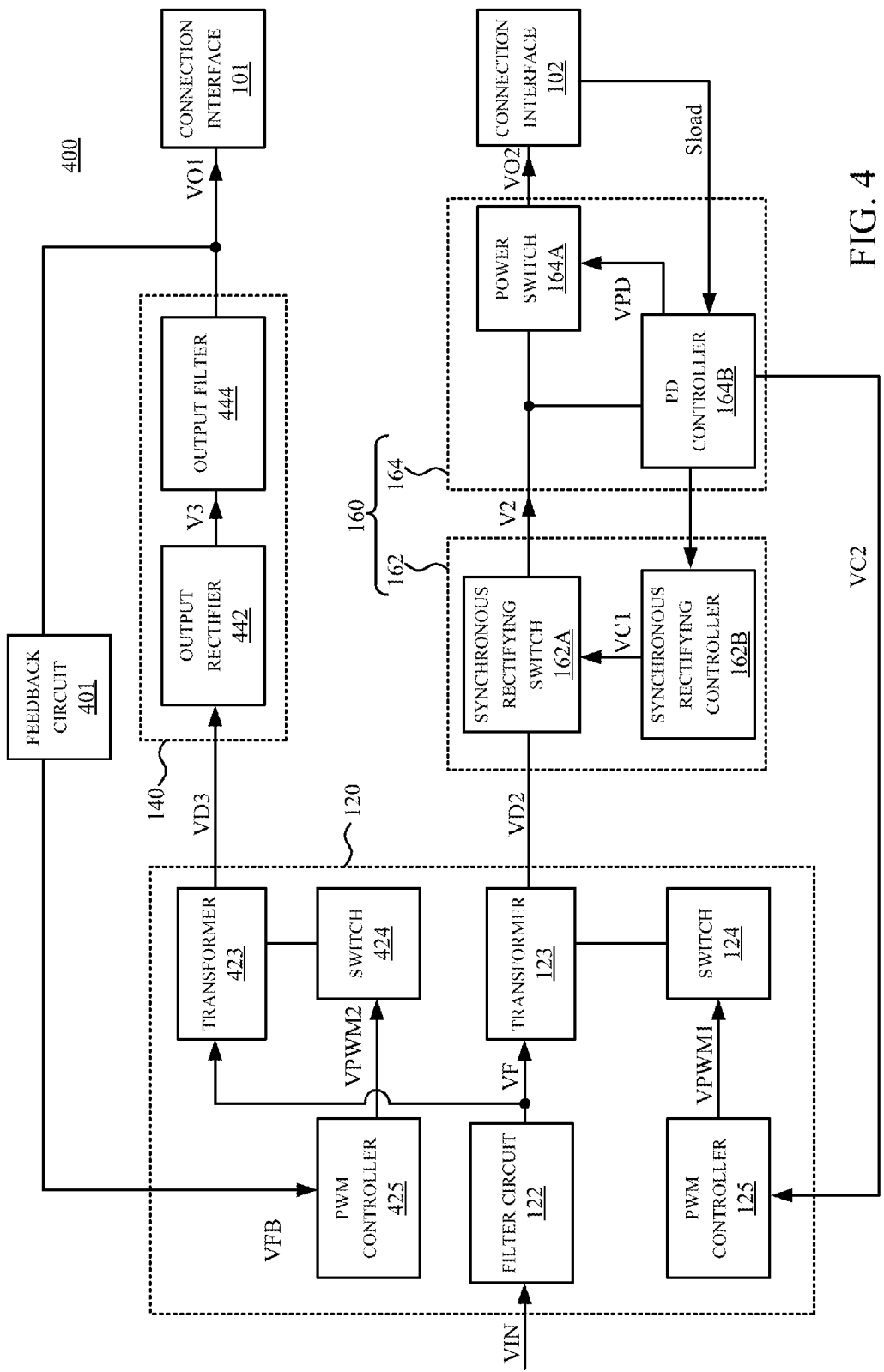
FIG. 4 is a schematic diagram of a power supply device, in accordance with some embodiments of the present disclosure.

Reference is now made to FIG. 4. FIG. 4 is a schematic diagram of a power supply device 400, in accordance with some embodiments of the present disclosure. For ease of understanding, similar elements in FIG. 4 are designated with the same reference numbers with respect to FIG. 2A.

Compared with FIG. 2A, the power supply device 400 further includes a feedback circuit 404, and the input stage circuit 120 thereof further includes a transformer 423, a switch 424, and a PWM controller 425. The transformer 423 is coupled between the filter circuit 122 and the voltage conversion circuit 140. The transformer 423 is configured to output a driving voltage VD3 to the voltage conversion unit 140 based on the filtered voltage VF. The switch 424 is coupled to the transformer 423, and is configured to regulate the driving voltage VD3 according to a pulse signal VPWM2. The PWM controller 425 is coupled to the switch 424, and is configured to output the pulse signal VPWM2 according to a feedback signal VFB. The feedback circuit 401 is coupled between the voltage conversion unit 140 and the connection interface 101, and is configured to generate the feedback signal VFB based on the output voltage VO1. In some embodiments, the feedback circuit 401 can be implemented with a voltage divider, in order to divide the output voltage VO1 to generate the feedback signal VFB. The above implementation of the feedback circuit 401 is given for illustrative purposes only, and the present disclosure is not limited thereto.

In this example, the voltage conversion unit 140 includes an output rectifier 442 and an output filter 444. The output rectifier 442 is coupled to the transformer 401 to receive the driving voltage VD3. The output rectifier 442 is configured to perform the step-down operation on the driving voltage VD3 to generate a voltage V3. The output filter 444 is coupled to the output rectifier 442, and is configured to filter noises on the voltage V3 to generate the output voltage VO1.

Compared with the above embodiments, the input stage circuit 120 of this example employs two transformers to generate two independent driving voltages VD2 and VD3. With such arrangements, the stability and the regulation rate of the output voltages VO1 and VO2 are able to be improved.

In various embodiments above, the input stage circuit 120, the voltage conversion unit 140, and the voltage conversion unit 160 are able to be implemented with various active or passive components or combinations thereof. In some embodiments, the passive components include resistors, capacitors, and/or inductors. In some embodiments, the active components include an electronic energy conversion chip, a power management chip, a micro controller, an analog circuit chip, a digital circuit chip, and/or application-specific integrated circuits.

Figure 5:
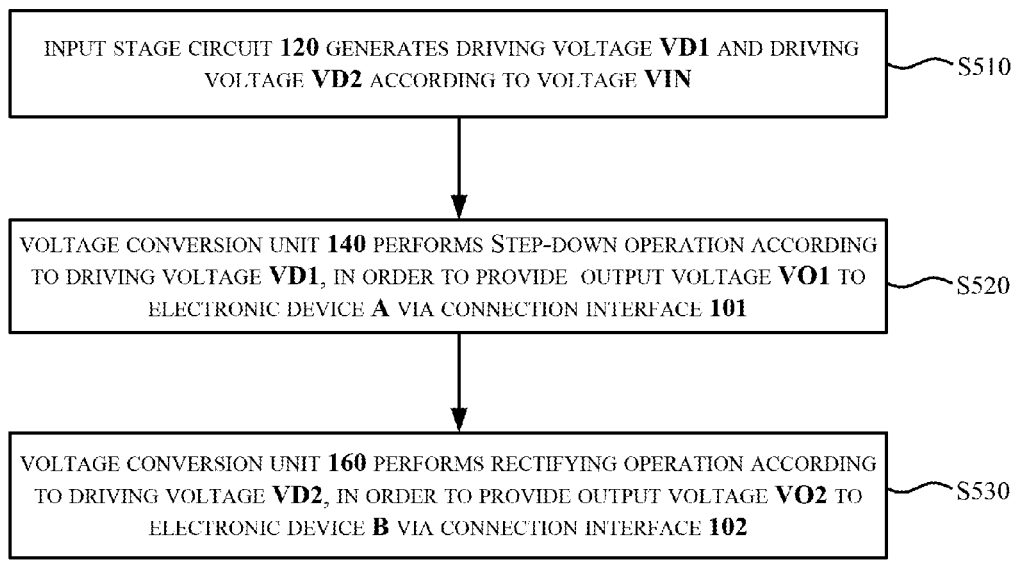
FIG. 5 is a flow chart of a power supply method, in accordance with some embodiments of the present disclosure.

FIG. 5 is a flow chart of a power supply method 500, in accordance with some embodiments of the present disclosure. Reference is now made to FIGS. 2A, 2B, and 5, and operations of the power supply device 200 are described with reference to the power supply method 500.

In operation S510, the input stage circuit 120 generates a driving voltage VD1 and a driving voltage VD2 according to the voltage VIN.

In operation S520, the voltage conversion unit 140 performs a step-down operation according to the driving voltage VD1, in order to provide the output voltage VO1 to the electronic device A via the connection interface 101. For example, as shown in FIGS. 2A and 2B, the rectifying circuit 142 cooperates with the DC-to-DC controller 144 in response to the driving voltage VD1, in order to generate the output voltage VO1.

In operation S530, the voltage conversion unit 160 performs a rectifying operation according to the driving voltage VD2, in order to provide the output voltage VO2 to the electronic device B via the connection interface 102. For example, as shown in FIGS. 2A and 2B, the rectifying circuit 162 cooperates with the PD circuit 164 in response to the driving voltage VD2, in order to generate the output voltage VO2.

The above description of the power supply method 500 includes exemplary operations, but the operations of the power supply method 500 are not necessarily performed in the order described above. The operations of the power supply method 500 disclosed in the present disclosure can be added, replaced, omitted, or performed in different orders, in accordance with the spirit and scope of various embodiments of the present disclosure.

The operations of the power supply method 500, which are described with reference to the power supply device 200, are given for illustrative purposes only. In various embodiments, the above operations are also able to be performed by the power supply device 300 or the power supply device 400.

As discussed above, the power supply device and the power supply method of the present disclosure are able to simultaneously provide electrical energy to electronic devices, which have different types of connection interfaces, with multiple arrangements.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply device, comprising:
   a first voltage conversion unit configured to perform a step-down operation according to a first voltage, in order to output a first output voltage via a first connection interface; and
   a second voltage conversion unit coupled to the first voltage conversion unit, the second voltage conversion unit comprising:
   a first rectifying circuit configured to perform a first rectifying operation based on a load information of a load and the first voltage, in order to generate a second voltage; and
   a power delivery circuit coupled to the first rectifying circuit, and configured to output the second voltage as a second output voltage to the load on condition that the second voltage meets a voltage requirement of the load information via a second connection interface, wherein the power delivery circuit is coupled to the second connection interface to detect the load information, the first connection interface is different from the second connection interface, and the second output voltage is higher than or equal to the first output voltage.

2. The power supply device of claim 1, wherein the first connection interface is a universal serial bus (USB) Type-A interface, and the second connection interface is a USB Type-C interface.

3. The power supply device of claim 1, wherein the first voltage conversion unit comprises:
   a second rectifying circuit configured to perform a second rectifying operation according to the first voltage to generate a third voltage; and
   a DC-to-DC controller coupled between the second rectifying circuit and the first connection interface, and configured to perform the step-down operation on the third voltage to generate the first output voltage.

4. The power supply device of claim 1, wherein the first rectifying circuit comprises:
   a synchronous rectifying switch configured to perform the first rectifying operation according to a first control signal and the first voltage, in order to generate the second voltage; and
   a synchronous rectifying controller configured to generate the first control signal based on the load information.

5. The power supply device of claim 4, wherein the power delivery circuit comprises:
   a power switch coupled between the synchronous rectifying switch and the second connection interface, and configured to be turned on according to a power supply control signal, in order to output the second output voltage; and a power delivery controller coupled between the power switch and the synchronous rectifying controller, and configured to output the power supply control signal on condition that the second voltage meets the voltage requirement of the load information, in order to turn on the power switch, wherein the power delivery controller is further configured to control the synchronous rectifying controller based on the load information.

6. The power supply device of claim 5, further comprising:

a first transformer comprising a first primary winding and a first secondary winding, wherein the synchronous rectifying switch is coupled to the first secondary winding; and a filter circuit coupled to a first terminal of the first primary winding, and configured to filter the first voltage to generate a filtered voltage to the first terminal of the first primary winding.

7. The power supply device of claim 6, wherein the first secondary winding comprises:

a first auxiliary winding electrically coupled to the first primary winding, and configured to output a first driving voltage, wherein the first voltage conversion unit is further configured to perform the step-down operation on the first driving voltage, in order to generate the first output voltage; and a second auxiliary winding electrically coupled to the first primary winding, and coupled to the first auxiliary winding in series, the second auxiliary winding configured to output a second driving voltage, wherein the synchronous rectifying switch is further configured to perform the first rectifying operation on the second driving voltage, in order to generate the second voltage.

8. The power supply device of claim 7, further comprising:

a first switch coupled to a second terminal of the first primary winding, and configured to regulate the first driving voltage and the second driving voltage according to a first pulse signal; and a first pulse width modulation controller coupled to the first switch, and configured to generate the first pulse signal according to a second control signal, wherein the power delivery controller is further configured to generate the second control signal based on the load information.

9. The power supply device of claim 5, further comprising:

a filter circuit configured to filter the first voltage to generate a filtered voltage;

a first transformer coupled between the filter circuit and the first voltage conversion unit, and configured to output a first driving voltage to the first voltage conversion unit based on the filtered voltage, wherein the first voltage conversion unit is further configured to perform the step-down operation on the first driving voltage, in order to output the first output voltage;

a first switch coupled to the first transformer, and configured to regulate the first driving voltage according to a first pulse signal;

a first pulse width modulation controller coupled to the first switch, and configured to generate the first pulse signal according to a feedback signal;

a second transformer coupled between the filter circuit and the first rectifying circuit, and configured to output a second driving voltage to the synchronous rectifying switch based on the filtered voltage, wherein the synchronous rectifying switch is further configured to perform the first rectifying operation on the second driving voltage, in order to generate the second voltage;

a second switch coupled to the second transformer, and configured to regulate the second driving voltage according to a second pulse signal; and a second pulse width modulation controller coupled to the second switch, and configured to generate the second pulse signal according to a second control signal, wherein the power delivery controller is further configured to generate the second control signal based on the load information.

10. The power supply device of claim 1, further comprising:

a power switch coupled between the first rectifying circuit and the first connection interface, wherein the first voltage conversion unit is further configured to receive the second voltage, and to perform the step-down operation on the second voltage to generate the first output voltage, and the power delivery circuit is further configured to detect the second voltage, and to control the power switch to transmit the second voltage to the first connection interface on condition that the second voltage is at a predetermined voltage level, in order to output the second voltage as the first output voltage.

11. A power supply method, comprising:

performing a step-down operation according to a first voltage, in order to output a first output voltage via a first connection interface; and performing a first rectifying operation based on a load information of a load and the first voltage, in order to generate a second voltage; and outputting the second voltage as a second output voltage to the load on condition that the second voltage meets a voltage requirement of the load information via a second connection interface, wherein the load information is detected by a power delivery circuit that is coupled to the second connection interface, the first connection interface is different from the second connection interface, and the second output voltage is higher than or equal to the first output voltage.

12. The power supply method of claim 11, wherein the first connection interface is a universal serial bus (USB) Type-A interface, and the second connection interface is a USB Type-C interface.

13. The power supply method of claim 11, wherein the step of performing the step-down operation comprises:

performing a second rectifying operation according to the first voltage to generate a third voltage; and performing, by a DC-to-DC controller, the step-down operation on the third voltage to generate the first output voltage.

14. The power supply method of claim 11, wherein the step of performing the first rectifying operation comprises:

performing, by a synchronous rectifying switch, the first rectifying operation according to a first control signal and the first voltage, in order to generate the second voltage; and generating, by a synchronous rectifying controller, the first control signal based on the load information.

15. The power supply method of claim 14, wherein the step of determining whether to output the second voltage comprises:
    turning on a power switch according to a power supply control signal, in order to output the second output voltage, wherein the power switch is coupled between the synchronous rectifying switch and the second connection interface; and
    outputting, by a power delivery controller, the power supply control signal on condition that the second voltage meets the voltage requirement of the load information, in order to turn on the power switch, wherein the power delivery controller is further configured to control the synchronous rectifying controller based on the load information.

16. The power supply method of claim 15, further comprising:
    filtering the first voltage to generate a filtered voltage to a first primary winding of a first transformer,
    wherein the synchronous rectifying switch is coupled to a first secondary winding of the first transformer.

17. The power supply method of claim 16, further comprising:
    outputting, by a first auxiliary winding of the first secondary winding, a first driving voltage, wherein the step-down operation is performed on the first driving voltage to generate the first output voltage; and
    outputting, by a second auxiliary winding of the first secondary winding, a second driving voltage, wherein the second auxiliary winding is electrically coupled to the first primary winding and is coupled to the first auxiliary winding in series, and the first rectifying operation is performed on the second driving voltage to generate the second voltage.

18. The power supply method of claim 17, further comprising:
    regulating the first driving voltage and the second driving voltage according to a first pulse signal; and
    generating the first pulse signal according to a second control signal, wherein the power delivery controller is further configured to generate the second control signal based on the load information.

19. The power supply method of claim 15, further comprising:
    filtering the first voltage to generate a filtered voltage;
    outputting, by a first transformer, a first driving voltage to the first voltage conversion unit based on the filtered voltage, wherein the step-down operation is performed on the first driving voltage to output the first output voltage;
    regulating the first driving voltage according to a first pulse signal;
    generating the first pulse signal according to a feedback signal;
    outputting, by a second transformer, a second driving voltage to the synchronous rectifying switch, wherein the first rectifying operation is performed on the second driving voltage to generate the second voltage;
    regulating the second driving voltage according to a second pulse signal;
    generating the second pulse signal according to a second control signal; and
    generating, by the power delivery controller, the second control signal based on the load information.

20. The power supply method of claim 11, further comprising:
    performing the step-down operation on the second voltage to generate the first output voltage;
    detecting, by the power delivery circuit, the second voltage; and
    transmitting the second voltage to the first connection interface on condition that the second voltage is at a predetermined voltage level, in order to output the second voltage as the first output voltage.

* * * * *